United States Patent
Cho

(10) Patent No.: US 10,612,824 B2
(45) Date of Patent: Apr. 7, 2020

(54) GAS-LIQUID PHASE SEPARATOR

(71) Applicant: HAMILTON SUNDSTRAND CORPORATION, Charlotte, NC (US)

(72) Inventor: Wei-Lin Cho, Unionville, CT (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 791 days.

(21) Appl. No.: 15/148,461

(22) Filed: May 6, 2016

(65) Prior Publication Data

US 2017/0321936 A1 Nov. 9, 2017

(51) Int. Cl.
| | | |
|---|---|---|
| F25B 43/00 | (2006.01) | |
| B01D 19/00 | (2006.01) | |
| B01D 46/00 | (2006.01) | |
| F25B 13/00 | (2006.01) | |
| F25B 39/00 | (2006.01) | |
| F25B 39/02 | (2006.01) | |
| F25B 39/04 | (2006.01) | |

(52) U.S. Cl.
CPC .......... *F25B 43/00* (2013.01); *B01D 19/0031* (2013.01); *B01D 19/0057* (2013.01); *B01D 46/0031* (2013.01); *F25B 13/00* (2013.01); *F25B 39/00* (2013.01); *F25B 39/02* (2013.01); *F25B 39/04* (2013.01)

(58) Field of Classification Search
CPC .......... F25B 43/00; F25B 13/00; F25B 39/00; F25B 39/04; F25B 43/006; F25B 2400/02; F25B 2400/23; B01D 19/0031; B01D 19/0057; B01D 46/0031
See application file for complete search history.

(56) References Cited

U.S. PATENT DOCUMENTS

| | | | |
|---|---|---|---|
| 2,011,048 | A | 8/1935 | Goldberg |
| 4,482,364 | A | 11/1984 | Martin et al. |
| 4,666,476 | A * | 5/1987 | Reeve ................ B01D 19/0057 55/345 |
| 6,629,428 | B1 | 10/2003 | Murry |
| 6,704,625 | B2 | 3/2004 | Albero et al. |
| 6,845,630 | B2 | 1/2005 | Bruno et al. |
| 7,322,202 | B2 | 1/2008 | Zywiak et al. |
| 7,578,136 | B2 | 8/2009 | Derouineau et al. |
| 7,970,497 | B2 | 6/2011 | Derouineau et al. |

(Continued)

FOREIGN PATENT DOCUMENTS

| | | |
|---|---|---|
| CA | 2221191 | 5/1996 |
| WO | 2014047527 A2 | 3/2014 |

OTHER PUBLICATIONS

Search Report regarding related EP App. No. 17169874.9; dated Jul. 21, 2017; 8 pgs.

*Primary Examiner* — Henry T Crenshaw
*Assistant Examiner* — Kamran Tavakoldavani
(74) *Attorney, Agent, or Firm* — Cantor Colburn LLP

(57) ABSTRACT

A device for separating gas and liquid from a mixture of gas and liquid phases includes a fluid guide member comprising a fluid inlet and a fluid outlet connected by a conduit configured as an elongated spiral disposed about an axis. A liquid coalescing medium is disposed on an exterior surface of the fluid guide radially outward from the elongated spiral conduit with respect to the axis. The separator also includes a plurality of radial channels providing radial flow paths for fluid from the elongated spiral conduit to the coalescing medium.

20 Claims, 4 Drawing Sheets

(56) References Cited

U.S. PATENT DOCUMENTS

| | | | |
|---|---|---|---|
| 8,572,996 B2 | 11/2013 | Dittmar et al. | |
| 8,662,445 B2 | 3/2014 | Bruno et al. | |
| 8,742,605 B1 | 6/2014 | Wilhide et al. | |
| 8,973,393 B2 | 3/2015 | Atkey et al. | |
| 9,254,920 B2 | 2/2016 | Zhou et al. | |
| 2005/0092179 A1* | 5/2005 | Barnwell | B01D 46/0031 95/273 |
| 2008/0264084 A1 | 10/2008 | Derouineau et al. | |
| 2012/0138737 A1 | 6/2012 | Bruno et al. | |
| 2013/0174589 A1* | 7/2013 | Wightman | F25B 13/00 62/81 |
| 2013/0276416 A1* | 10/2013 | Schook | B01D 45/06 55/462 |
| 2014/0331692 A1 | 11/2014 | Eowsakul | |
| 2014/0345312 A1* | 11/2014 | Katoh | B60H 1/00342 62/277 |
| 2014/0360880 A1* | 12/2014 | Mahmoudi | B01D 17/06 204/563 |
| 2016/0250579 A1* | 9/2016 | Bini | F01K 25/06 95/268 |

* cited by examiner

GAS-LIQUID PHASE SEPARATOR

BACKGROUND

The separation of gas and liquid phases from mixtures comprising gas and liquid phases is practiced across a wide variety of applications and materials. Gas-liquid phase separation is used in the oil and gas industry, various chemical manufacturing and treatment processes, heating and cooling applications, fuel management systems, and numerous other applications. For example, in many chemical manufacturing and treatment processes, liquid and gas phases are separated and directed along different paths for further individual processing or treatment.

Many known gas-liquid separators utilize a coalescing medium such as a screen mesh or other porous medium to separate gas and liquid phases. During operation of such gas-liquid separators, as a gas-liquid mixture makes contact with the coalescing medium, liquid becomes engaged with the coalescing medium. The coalescing medium is typically oriented such that as liquid accumulates on the coalescing medium, liquid droplets become larger until their mass becomes sufficiently high that the force of gravity acting on the droplets causes them to migrate downward through or along the coalescing medium until they reach a collection point at the bottom of the coalescing medium. Such separators, however, are not effective in environments where gravitational forces are either not available (e.g., microgravity environments such as outer space) or are subject to interference (e.g., by changes in momentum when the separator is in motion such as on a motor vehicle or aircraft).

BRIEF DESCRIPTION

According to some embodiments, a device for separating gas and liquid from a mixture comprising gas and liquid phases comprises a fluid guide member comprising a fluid inlet and a fluid outlet connected by a conduit configured as an elongated spiral disposed about an axis. A liquid coalescing medium is disposed on an exterior surface of the fluid guide radially outward from the elongated spiral conduit with respect to the axis. The separator also includes a plurality of radial channels providing radial flow paths for fluid from the elongated spiral conduit to the coalescing medium.

In some embodiments, a method of separating gas and liquid from a mixture comprising gas and liquid phases, comprising introducing the mixture to the fluid inlet of the above-described gas-liquid separator, receiving a gas-depleted phase at a radially outer surface of the coalescing medium, and receiving a liquid-depleted phase at the fluid outlet.

According to some embodiments, a heat transfer system comprises a heat transfer fluid flow loop. The heat transfer fluid flow loop comprises an evaporator heat exchanger comprising a heat absorption side comprising a fluid inlet and a fluid outlet for the heat transfer fluid. The evaporator is configured to absorb heat from a conditioned space to vaporize a liquid phase of the heat transfer fluid. A condenser heat exchanger comprising a heat rejection side includes a fluid inlet in fluid communication with the evaporator heat absorption side outlet, and a fluid outlet for the heat transfer fluid. The condenser is configured to reject heat to a heat sink to condense a gas phase of the heat transfer fluid. The heat transfer system also includes a gas-liquid separator. The gas-liquid separator comprises a fluid guide member comprising a fluid inlet in fluid communication with the condenser heat rejection side outlet, and a fluid outlet. The separator's fluid inlet and fluid outlet are connected by a conduit configured as an elongated spiral disposed about an axis. A liquid coalescing medium is disposed on an exterior surface of the fluid guide radially outward from the elongated spiral conduit with respect to the axis. The separator also includes a plurality of radial channels providing radial flow paths for fluid from the elongated spiral conduit to the coalescing medium. The heat transfer system also includes a pump comprising a fluid inlet in fluid communication with the fluid guide member fluid outlet, and a fluid outlet in fluid communication with the evaporator heat absorption side inlet.

BRIEF DESCRIPTION OF THE DRAWINGS

Subject matter of this disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
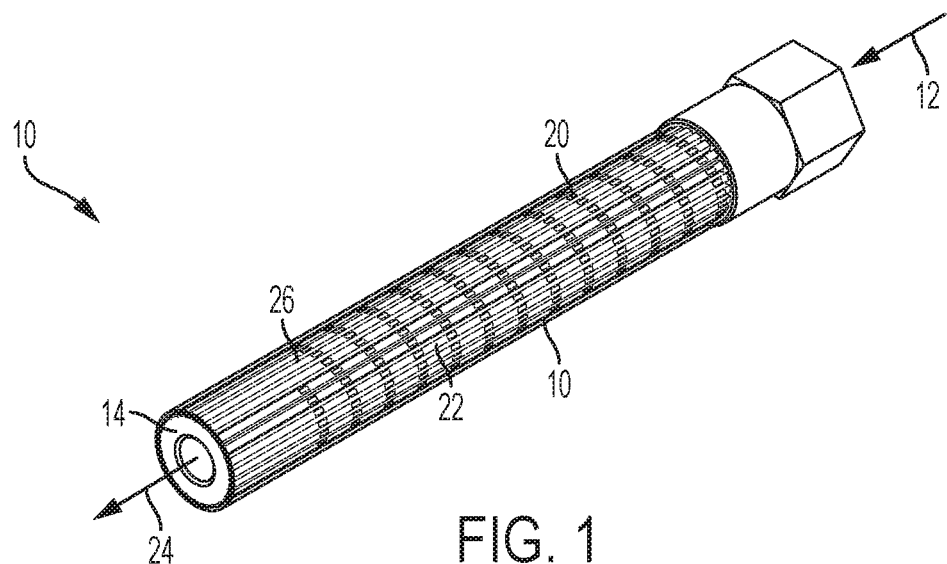
FIG. 1 is a schematic depiction in a perspective view of an example embodiment of a gas-liquid separator.
Figure 2:
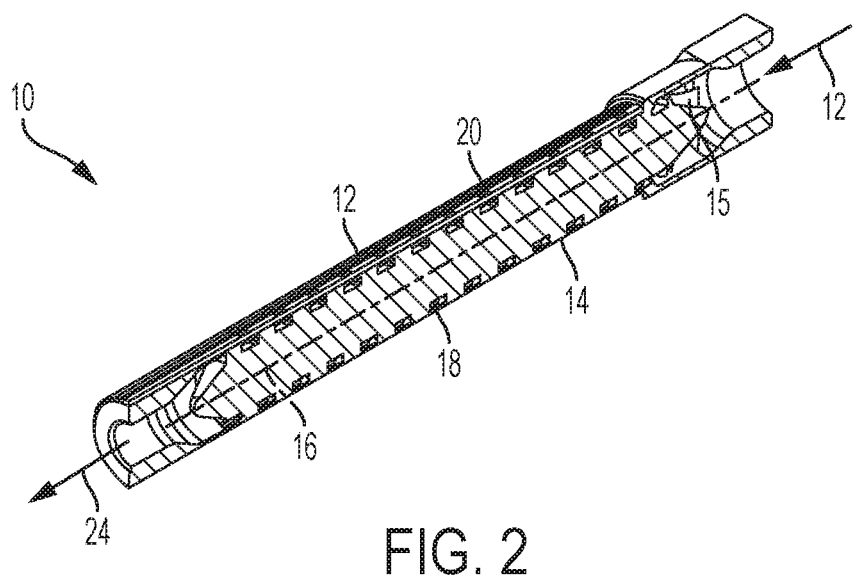
FIG. 2 is a perspective cross-section view of the gas-liquid separator of FIG. 1.
Figure 3:
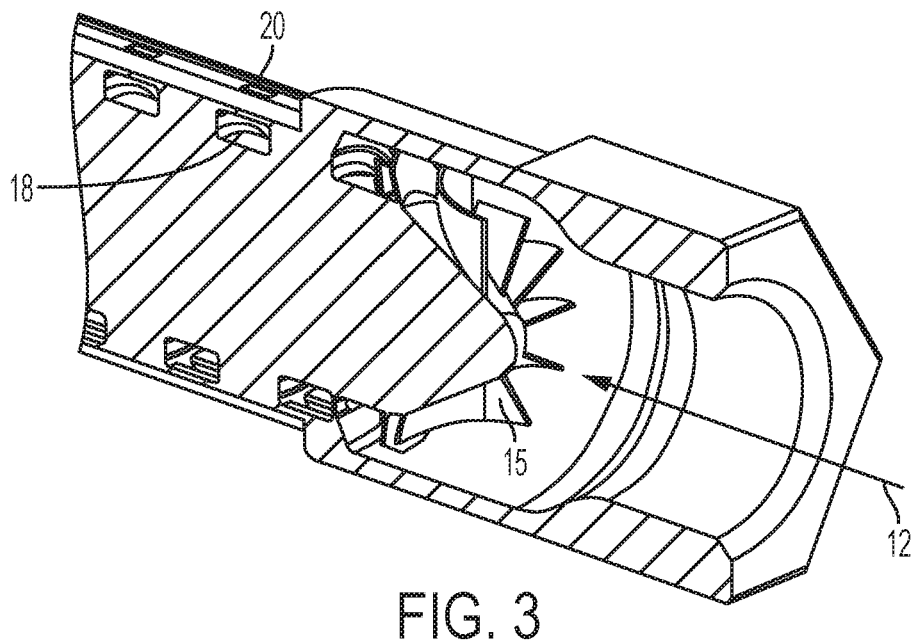
FIG. 3 is a magnified view of a portion of the perspective cross-section of FIG. 2.
Figure 4:
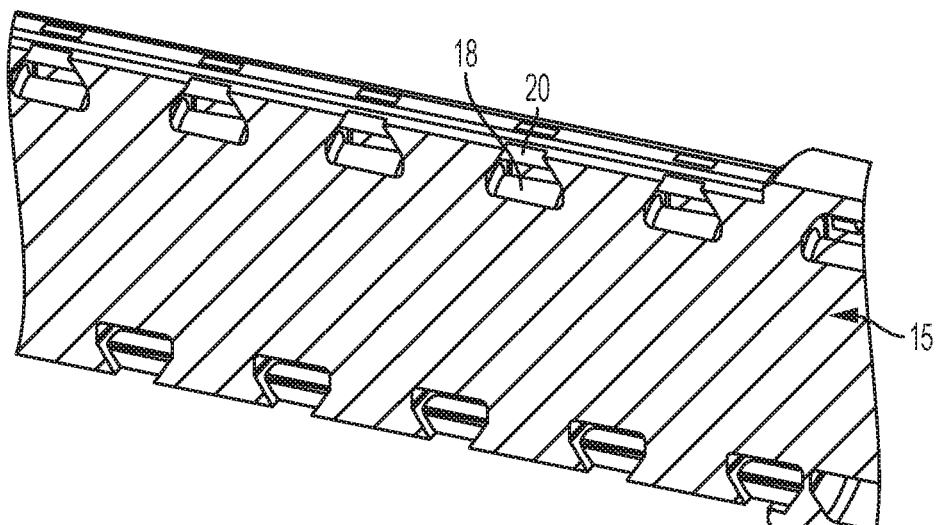
FIG. 4 is a magnified view of a portion of a perspective cross-section of the gas-liquid separator of FIG. 1, taken on a different parting line than FIGS. 2 and 3, through the radial channels.

With reference now to the Figures, FIGS. 1-4 schematically depict the details of an example embodiment of a gas-liquid separator 10. As shown in FIGS. 1-4, a fluid mixture 12 comprising a gas and a liquid is shown entering the inlet of a guide member 14. Guide vanes 15 deflect the flow of the fluid mixture 12 and redirect it from an axial flow parallel to the axis 16 to a circumferential flow into conduit 18 disposed as an elongated spiral about the axis 16. It should be noted that the guide vanes are optional, and the fluid mixture 12 can be allowed to flow into the elongated spiral conduit 18 without assistance from any guide vanes, although an abrupt 90° turn from axial flow to circumferential flow can cause unwanted turbulence and pressure drop. In some embodiments (not shown), the fluid can enter or exit the guide member 14 from a direction perpendicular to the axis so that it is flowing more or less straight into the inlet to elongated spiral conduit 18. It should also be noted that although FIGS. 1-4 depict only a single elongated spiral conduit 18, a plurality of parallel elongated spiral conduits can be utilized.

As the fluid flows through the elongated spiral conduit 18, centrifugal force acts on both the gas and liquid components of the fluid, and the density difference between the gas and liquid results in the centrifugal force preferentially directing the liquid component radially outward compared to the gas.

The action of the centrifugal force drives the fluid radially outward through the plurality of radial channels 20, which direct the fluid into contact with a coalescing medium 22 disposed on the outer surface of the guide member 14. The internal surfaces of the elongated spiral conduit 18, the coalescing medium 22, and other surfaces in contact with the fluid can be formed from or treated with materials that provide a surface that is wettable by liquid component of the fluid. Wettable surfaces can include cleaned metals, plastics, and polymers, any of which may be chemically and/or physically treated. A surface is considered wettable or non-wettable by a particular liquid depending on the contact angle between the liquid and the surface. A small contact angle (e.g., ≤90°) means the surface is wettable, and a large contact angle (e.g., >90°) means the surface is not wettable and vice versa. Different chemical treatments (such as low to mid concentrations acid etching and cleaning) and physical treatments (such as laser scanning and coating) can be employed to alter the contact angle to make the surface wettable or non-wettable. The treatment processes is highly dependent of the liquid and surface being used. In some embodiments, this can provide a technical effect of promoting liquid flow in a layer along the surface(s) and gas flow through open spaces away from the liquid layer. In some embodiments, the radial flow paths provided by the radial channels become narrower as the fluid flows from the elongated spiral conduit 18 to the coalescing medium 22. In some embodiments, such a configuration can provide a technical effect of enhancing liquid phase adhesion to the porous media (coalescing medium) utilizing the surface tension of the liquid that promote phase separation. An example embodiment of such narrowing is depicted in cross-sectional view of FIG. 4 along a parting line through a group of the radial channels 20, where it is seen that the radial channels 20 have a relatively larger cross-sectional area at the interface with the elongated spiral conduit 18, and a relatively smaller cross-sectional area at the interface with the coalescing medium.

Figure 5:
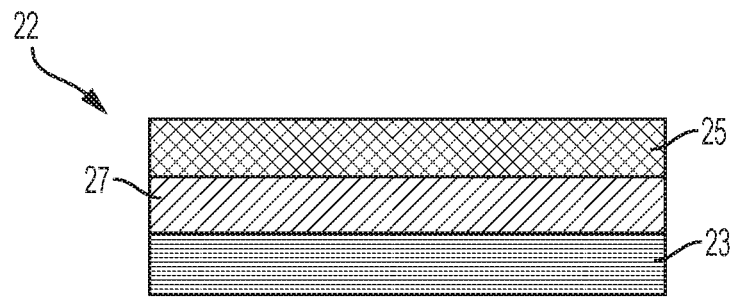
FIG. 5 is a cross-section view of a schematic representation of a multilayer coalescing medium.

The coalescing medium can selected from any of a wide variety of porous media, including but not limited to mesh screens or pads made of various materials such as metal or plastic, woven or non-woven fiber pads, open-cell foams made of various materials such as metal, plastic, or composite materials. The dimensions of the coalescing medium can vary depending on the specific properties of the liquid (e.g., density, surface tension properties, etc.) and the gas, and on process design parameters including but not limited to mass flow rates and flow velocities. In some embodiments, the dimensions or materials of the coalescing medium can vary axially along the axis 16 to accommodate different conditions as the fluid flows along the elongated spiral conduit. In some embodiments, the dimensions or materials of the coalescing medium can vary radially. For example, the coalescing medium can have larger openings (e.g., coarser mesh) relatively closer to the axis 16 and smaller openings (e.g., finer mesh) relatively farther from the axis 16. In some embodiments (e.g., as depicted in an example embodiment in FIG. 5), the coalescing medium 22 can comprise a first screen mesh layer 23, and a second screen mesh layer 25 radially outward from the first screen mesh layer and having a finer mesh size than the first screen mesh layer. In some embodiments, the coalescing medium can comprise a third screen mesh layer 27 disposed between the first and second screen mesh layers and having a finer mesh size than the first screen mesh layer 23 and a courser mesh size than the second screen mesh layer 25. In some embodiments, the first screen mesh layer can have a mesh size of 20 μm to 50 μm, the second screen mesh layer can have a mesh size of 1 μm to 5 μm, and the third screen mesh layer can have a mesh size of 5 μm to 20 μm.

Figure 6:
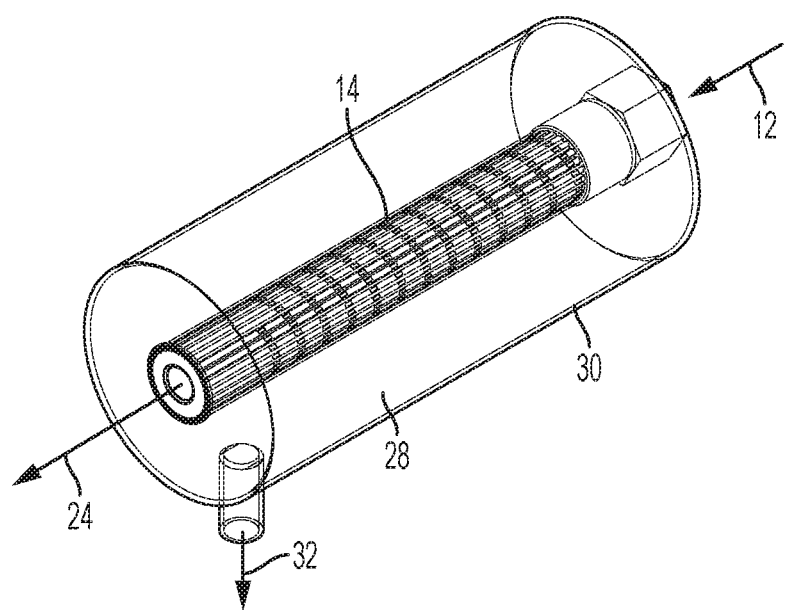
FIG. 6 is a perspective view of an example embodiment of a gas-liquid separator that includes a liquid collection chamber.

As the fluid flows along through the elongated spiral conduit 18, the liquid phase is depleted as it flows out through the radial channels 20, resulting in a liquid-depleted phase 24 exiting from the guide member 14. The length of the elongated spiral conduit 18, the number and configuration of the radial channels 20, and the configuration of the coalescing medium 22 can be specified according to design parameters to produce the desired degree of gas- and liquid-depletion in the two phases exiting the gas-liquid separator 10 at anticipated operating conditions. A gas-depleted phase can be collected from the coalescing medium 20, for example by accumulation in axial grooves 26 disposed on the outer surface of the gas-liquid separator 10. In some embodiments, the gas-depleted predominantly liquid phase can be allowed to accumulate in a chamber 28 surrounding the coalescing medium 20 or the gas-liquid separator 10 as shown in FIG. 6, with or without the use of axial grooves 26. As shown in FIG. 6, a housing 30 is disposed around the gas-liquid separator 10, providing a chamber 28 for accumulation of a liquid or gas-depleted phase, which can exit the chamber 28 as fluid stream 32.

Figure 7:
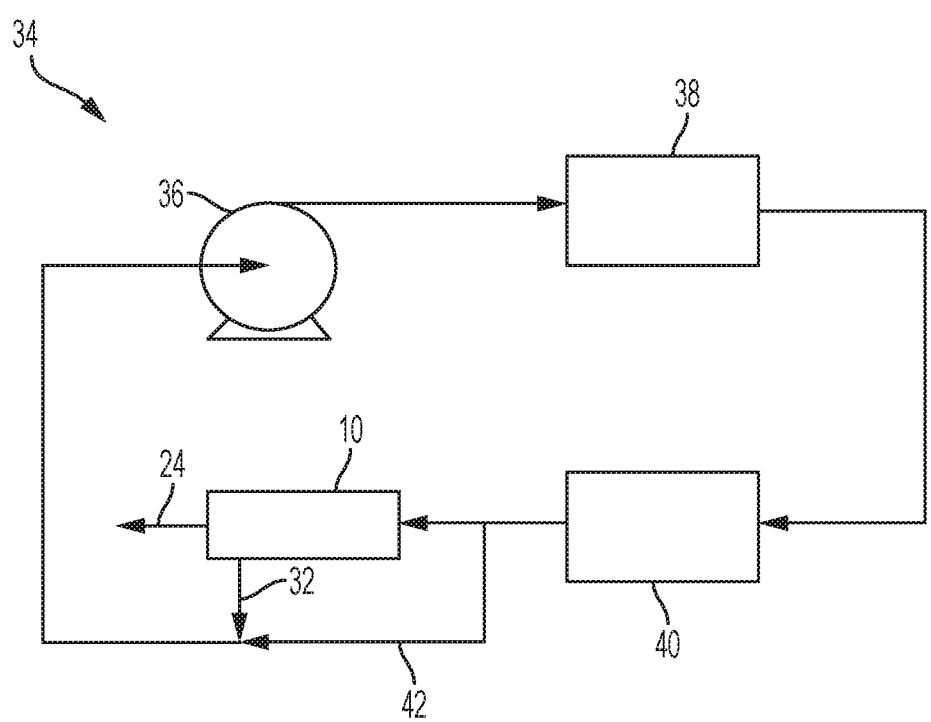
FIG. 7 is a schematic depiction of a heat transfer system including a gas-liquid phase separator.

The gas-liquid phase separator described herein can be utilized in a variety of environments and applications. In some embodiments, the gas-liquid phase separator can be disposed in a microgravity environment, where it can in some embodiments provide phase separation without moving parts and without assistance from gravity. In some embodiments, the gas-liquid phase separator can be utilized in a heat transfer system such as a two-phase heat transfer system. In some embodiments, the heat transfer system is disposed in a microgravity environment. An example embodiment of a two-phase heat transfer system 34 is schematically depicted in FIG. 7 where fluid flow paths are indicated by arrowed lines connecting the described components. As shown in FIG. 7, a pump 36 pumps a heat transfer fluid in a liquid phase to the heat absorption side of an evaporator heat exchanger 38 where heat (e.g., from a conditioned space, not shown) is absorbed as the liquid heat transfer fluid is vaporized. The heat transfer fluid can be any type of fluid having target thermodynamic properties, including but not limited to water, ammonia, or organic solvents (e.g., R134A). The vaporized heat transfer fluid is transported from the evaporator heat exchanger 38 to the heat rejection side of a condenser heat exchanger 40 where the vaporized heat transfer fluid is condensed to a liquid phase and heat is rejected to a heat sink (not shown, e.g., an external space such as an outdoor space for terrestrial applications or outer space for extra-terrestrial outer space applications). Under normal operating conditions, the design parameters of the condenser heat exchanger 40 are expected to fully condense the vaporized heat transfer fluid, and the liquid phase heat transfer fluid is directed along bypass flow path 42 to the inlet of pump 36. Under some operating conditions, however, the condenser heat exchanger 40 may not fully condense the vaporized heat transfer fluid, resulting in a two-phase flow of heat transfer fluid exiting the heat rejection side of condenser heat exchanger 40. Such conditions can occur, for example, when the heat load applied at the evaporator heat exchanger 38 exceeds system design parameters such as during startup or other high heat load conditions, or when the heat absorbing capacities of the heat absorption side of the condenser heat exchanger 40 are reduced below design parameters such as when the heat sink temperature increases. The latter can occur, for example, in an outer space application where the spacecraft is re-oriented such that the condenser heat exchanger 40 is exposed to solar radiation. A two-phase gas-liquid fluid can cause cavitation at the pump 36, potentially resulting in damage to the pump. Accordingly, in conditions where a two-phase heat transfer fluid exits the heat rejection side of condenser heat exchanger 40, the flow of the heat transfer fluid can be routed to the gas-liquid phase separator 10 where the vapor phase is removed as liquid-depleted or vapor stream 24, and a vapor-depleted or liquid stream 32 is directed to the inlet of pump 36. The liquid-depleted or vapor stream 24 can be recirculated to the inlet of the gas-liquid phase separator 10 or can be stored in a storage vessel (not shown) until normal operating conditions resume, at which time any vapor that has not condensed in the storage vessel can be routed to the inlet of the gas-liquid phase separator 10.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A device for separating gas and liquid from a mixture comprising gas and liquid phases, comprising
a fluid guide member comprising a fluid inlet and a fluid outlet connected by a conduit configured as an elongated spiral disposed about an axis;
a liquid coalescing medium disposed on an exterior surface of the fluid guide radially outward from the elongated spiral conduit with respect to the axis;
a plurality of radial channels providing radial flow paths for fluid from the elongated spiral conduit to the coalescing medium.

2. The device of claim 1, wherein the coalescing medium comprises a first screen mesh layer, and a second screen mesh layer radially outward from the first screen mesh layer and having a finer mesh size than the first screen mesh layer.

3. The device of claim 2, further comprising a third screen mesh layer disposed between the first and second screen mesh layers and having a finer mesh size than the first screen mesh layer and a courser mesh size than the second.

4. The device of claim 3, wherein the first screen mesh layer has a mesh size of 20 µm to 50 µm, the second screen mesh layer has a mesh size of 1 µm to 5 µm, and the third screen mesh layer has a mesh size of 5 µm to 20 µm.

5. The device of claim 1, further comprising a housing disposed about the fluid guide configured to provide a chamber between the liquid coalescing medium and the housing for collection of liquid from a radially outer surface of the coalescing medium, and a liquid outlet from the chamber.

6. The device of claim 1, wherein the radial channels have a larger cross-sectional area at the interface with the spiral conduit and a smaller cross-sectional area at the interface with the coalescing medium.

7. The device of claim 1, wherein the coalescing medium includes a plurality of grooves parallel to the axis at a radially outer surface of the coalescing medium.

8. The device of claim 1, wherein the guide member is configured to receive fluid flow in a direction parallel to the axis, and further comprises guide vanes to redirect axial fluid flow at the fluid inlet to a circumferential fluid flow direction into the elongated spiral conduit.

9. The device of claim 1, wherein the fluid flow inlet is configured to receive fluid flow in a direction perpendicular to the axis and parallel to the elongated spiral conduit at the fluid inlet.

10. The device of claim 1, disposed in a microgravity environment.

11. A heat transfer system, comprising a heat transfer fluid flow loop that comprises:
an evaporator heat exchanger comprising a heat absorption side comprising a fluid inlet and a fluid outlet for the heat transfer fluid, the evaporator configured to absorb heat from a conditioned space to vaporize a liquid phase of the heat transfer fluid;
a condenser heat exchanger comprising a heat rejection side comprising a fluid inlet in fluid communication with the evaporator heat absorption side outlet, and a fluid outlet for the heat transfer fluid, the condenser configured to reject heat to a heat sink to condense a gas phase of the heat transfer fluid;
a gas-liquid separator, comprising
a fluid guide member comprising a fluid inlet in fluid communication with the condenser heat rejection side outlet, and a fluid outlet, the fluid inlet and fluid outlet connected by a conduit configured as an elongated spiral disposed about an axis;
a liquid coalescing medium disposed on an exterior surface of the fluid guide radially outward from the elongated spiral conduit with respect to the axis;
a plurality of radial channels providing radial flow paths for fluid from the elongated spiral conduit to the coalescing medium; and
a pump comprising a fluid inlet in fluid communication with the fluid guide member fluid outlet, and a fluid outlet in fluid communication with the evaporator heat absorption side inlet.

12. The system of claim 11, disposed in a microgravity environment.

13. The system of claim 11, further comprising a fluid bypass around the gas-liquid separator, providing fluid communication between the condenser heat rejection side fluid outlet and the pump inlet.

14. The system of claim 11, wherein the coalescing medium comprises a first screen mesh layer, and a second screen mesh layer radially outward from the first screen mesh layer and having a finer mesh size than the first screen mesh layer.

15. The system of claim 14, further comprising a third screen mesh layer disposed between the first and second screen mesh layers and having a finer mesh size than the first screen mesh layer and a courser mesh size than the second.

16. The system of claim 15, wherein the first screen mesh layer has a mesh size of 20 µm to 50 µm, the second screen mesh layer has a mesh size of 1 µm to 5 µm, and the third screen mesh layer has a mesh size of 5 µm to 20 µm.

17. The system of claim 11, further comprising a housing disposed about the fluid guide configured to provide a chamber between the liquid coalescing medium and the housing for collection of liquid from the mixture, the housing further comprising a liquid outlet.

18. The system of claim 11, wherein the radial channels have a larger cross-sectional area at the interface with the spiral conduit and a smaller cross-sectional area at the interface with the coalescing medium.

19. A method of separating gas and liquid from a mixture comprising gas and liquid phases, comprising introducing the mixture to the fluid inlet of the device of claim 1, receiving a gas-depleted phase at a radially outer surface of the coalescing medium, and receiving a liquid-depleted phase at the fluid outlet.

20. A method of separating gas and liquid from a mixture comprising gas and liquid phases, comprising introducing the mixture to the fluid inlet of the device of claim 1 in microgravity conditions, receiving a gas-depleted phase at a radially outer surface of the coalescing medium, and receiving a liquid-depleted phase at the fluid outlet.

* * * * *